Patented Sept. 28, 1937

2,094,100

UNITED STATES PATENT OFFICE 2,094,100

MANUFACTURE OF CARBOHYDRATE DERIVATIVES

Henry Dreyfus, London, England

No Drawing. Application February 1, 1934, Serial No. 709,337. In France February 9, 1933

10 Claims. (Cl. 260—152)

This invention relates to the manufacture of derivatives of cellulose or other carbohydrates or other polyhydric alcohols and also to the application of the derivatives thus obtained.

In the past, cellulose derivatives have been obtained exclusively by the action of acids, acid chlorides or acid anhydrides or of esters of alcohols or of alkylene oxides upon cellulose, usually in presence of suitable catalysts, such as sulphuric acid, phosphoric acid, hydrochloric acid, zinc chloride, ferric chloride, caustic soda, caustic potash or ammonia or organic bases, for example pyridine, dimethyl aniline and the like.

I have now found that cellulose derivatives may be produced by the action of unsaturated organic compounds, and more especially compounds containing the ethylene linkage, upon cellulose. The reaction may be accelerated by the use of considerable pressures, for example pressures of the order of 10, 20, 50, 100 or 200 atmospheres or more, and of raised temperatures, for example temperatures of 100 to 200 or even up to 250° C. or more. The reaction may be carried out in presence of water, for example water in considerable quantity in which the cellulose is suspended, or water contained in the cellulose due to its hygroscopic properties or to water added thereto. Alternatively, the reaction may be carried out in presence of other media, as for example methyl, ethyl and other alcohols, ethers, e. g. isopropyl and butyl ethers, hydrocarbons, e. g. benzene, toluene and other aromatic hydrocarbons and ligroin, kerosene and other aliphatic hydrocarbons, or even organic acids, or in the presence of excess of a liquid unsaturated compound acting as diluent.

The reaction may be facilitated by the presence during the reaction either on the cellulose, in the reaction medium, or together with the unsaturated organic compound, of catalysts, and in this connection catalysts of the most varied character may be used. In the first place the alkalies, such as caustic soda or lime, ammonia and organic bases, for instance the mono-, di-, and tri-alkylamines or aralkylamines, piperidine, dimethylaniline or other primary, secondary or tertiary organic base, or alkali alcoholates, for example sodium ethylate, may be used. Acidic bodies and especially strong acids are, however, more effective in catalyzing the reaction. Thus there may be used sulphuric acid, phosphoric acid, alkali or alkaline earth bisulphates, naphthalene sulphonic acid or other sulphonic acids, and particularly naphthalene-β-sulphonic acids, alkyl sulphuric acids and their alkali and alkaline earth salts, chlor-sulphonic acid, more especially in the form of its salts, hydriodic acid and hydrobromic acid. Other acidic catalysts which may be used are halides of the metals, e. g. ferric chloride and ferric bromide and the corresponding copper, zinc and tin salts. Two or more of these catalysts may be present during the reaction, and such combined catalysts may even be opposite in their reaction.

The cellulose prior to bringing to reaction with the unsaturated body may be pretreated in any suitable manner so as to increase its reactivity, and in this connection the known methods of increasing reactivity either for the purpose of esterification or for the purpose of etherification are particularly valuable. Such pretreatment may be the means of incorporating the catalyst, if the pretreating agent employed be the same as the catalyst to be employed in the subsequent reaction, or alternatively the pretreating agent may be removed and the catalyst, if a catalyst is to be used, be subsequently incorporated in the cellulose. Pretreatments with sulphuric acid, phosphoric acid or mixtures thereof or hydrochloric acid, or organic acids, particularly formic and acetic acids, or mixtures of mineral acids with organic acids are of value. Preferably such a pretreatment with acids is not conducted in such a vigorous manner as to result in serious degradation of the cellulose, and for this reason it is advisable to use a mineral acid in gaseous state or in relatively low concentration and/or for a relatively short time, or to dilute it with a suitable medium, and particularly an organic acid, for example acetic acid. Organic acids when used alone for the pretreatment may also be used either in the liquid or in the gaseous state. Instead of using sulphuric acid or like acids as the pretreating agent less vigorous pretreating agents, such as sulphonic acids or alkali bisulphates or alkyl sulphuric acids, may be employed. Where suitable, a pretreating agent may be subsequently converted into the catalyst required for the reaction. For example, a pretreatment with sulphuric acid may be followed by partial neutralization with alkali so as to form in the material an alkali bisulphate to act as catalyst, and similarly, where an alkali is used for the pretreatment the cellulose containing the alkali may be subsequently treated with sulphuric acid or other acid so as to convert the alkali into alkali bisulphate or other desired catalyst. Pretreatments with alkali may be effected on the lines customarily adopted in the manufacture of cellulose ethers, and in this case it is desirable that the alkali shall itself constitute the catalyst in the subsequent substitution of the cellulose, or shall be convertible into the desired catalyst. Where in the subsequent reaction of the cellulose with the unsaturated body it is desired to carry out the reaction in the absence or substantial absence of water, a pretreatment, if applied, is preferably applied with non-aqueous media, as it is difficult to eliminate water from cellulose in the presence of acidic or basic reagents without somewhat deep-seated degradation of the cellulose.

The cellulose for treatment in accordance with the present invention may be in any desired form, for example as cotton linters or other waste cotton, esparto, or other grasses, or wood pulp, such as sulphite pulp, sulphate pulp or soda pulp, in the production of which lignone and resins have been substantially reduced. In the case of these wood pulps or similarly treated ligno-cellulosic materials, it is desirable to apply a final treatment for the removal of residues of lignone, for example the alkaline purifying step described in U. S. Patent No. 1,711,110. Cellulosic materials which have been treated as described in U. S. application S. No. 680,251 filed 13th July, 1933, may also be employed. Yarns, fibres or fabrics of cellulose or reconstituted cellulose may likewise be treated by the present processes. The invention also includes the treatment of any cellulose derivative which still contains reactive hydroxyl groups, for example, partially esterified or partially etherified celluloses. Such cellulose derivatives may already contain the catalyst which it is desired to use in the substitution reaction of the present invention. For example, in the manufacture of partially etherified cellulose a considerable amount of alkali may be retained in the crude etherification product for the purpose of acting as catalyst in the process of the invention, and similarly in the manufacture of acetates or other esters of cellulose by means of acid anhydride in presence of sulphuric acid, phosphoric acid or like catalysts or by means of acid chlorides in the presence of pyridine, caustic soda or other bases, the catalyst or excess of catalyst retained in the product may remain therein for the reactions according to the present processes.

Further, cellulose derivatives, whether or not they contain free hydroxyl groups, which yield free hydroxyl groups under the conditions of the reaction, may be employed. For example, a cellulose ester may be treated with the unsaturated compounds of the present invention in the presence of caustic soda or other base, so that some or all of the ester groups are saponified yielding free hydroxyl groups which react with the unsaturated body.

The unsaturated bodies for the present reactions may be hydrocarbon bodies, as for example ethylene, propylene, the butylenes, amylenes and hexylenes, cyclo-hexene, and methyl cyclo-hexenes, cyclo-hexadiene, octohydronaphthalenes, styrene and phenyl propylene, naphthyl-ethylenes, stilbene, acenaphthylene and their homologues, and also the compounds obtainable by splitting hydrochloric acid from benzyl chloride and preferably those which are soluble in organic solvents and appear to act as a lower homologue of styrene. Mixtures of the above reagents may of course be employed, and it is particularly important in accordance with the present invention to employ the mixtures of the olefines either occurring naturally or obtainable by commercial processing, for example a cracking of petroleum oils. Hydrocarbons of the acetylene series, for example allylene, may be used, though the results do not appear to be so satisfactory, possibly by reason of a simultaneous reaction to produce oxy groups in the cellulose derivative. In addition to hydrocarbon bodies of the above character, the invention envisages the use of substitution products thereof, for example nitro, amino or substituted amino, hydroxy, carboxy, or alkoxy substitution products, e. g., allyl alcohol, crotyl alcohol, hexenyl alcohol, eugenol, safrol, acrylic acid, crotonic acid, angelic acid, cinnamic acid and nitro-styrene. More particularly those hydrocarbons substituted by groups which are relatively non-reactive are to be employed. Where a reactive substituent is present it is preferable that the reaction conditions be such that the said reactive substituent does not react. Thus, for example, halogen substitution products may be employed under such conditions that the halogen, for example chlorine, is not eliminated. Neutral or acid conditions are conducive to this result. Unsaturated acids may be employed, for example in the form of their salts or in the presence of basic catalysts.

In addition to including the substitution of already etherified or esterified celluloses, the present invention contemplates simultaneous or subsequent etherification or esterification by means of reagents other than those characteristic of the invention. For example, the products of the invention may be formylated, acetylated, butyrated, benzoylated, methylated, ethylated or benzylated in accordance with the processes known in the art, using for example an acid anhydride or an acid chloride for an esterification, or the sulphate, chloride or like ester of the alcohol corresponding with the alcohol, the residue of which is to be introduced into the cellulose. Similarly, alkylene oxides or alkylene chlorhydrins may be used as etherifying agents so as to introduce hydroxy ether groups into the cellulose. Instead of effecting subsequent substitution of the cellulose a simultaneous substitution may be effected by treating the cellulose with the unsaturated bodies of the present invention together with other esterifying or etherifying agents. For example methyl chloride, ethyl chloride or like etherifying reagents or alkylene oxides may be used together with substituting agents of the invention. It is to be noted, however, that in such combined substitutions the different types of substituting agents should be incapable of reaction between themselves or incapable of sufficient reaction to prevent the substitution characteristic of the invention.

Where the reagents of the invention are gaseous or vaporizable the reaction may be carried out either in the gaseous phase or in the liquid phase, but in all cases it is advisable as already indicated to employ pressure. Liquid or solid reagents may likewise be employed under pressure. Solid reagents, and indeed gaseous and liquid reagents as well, may, as described above, be brought to reaction with the cellulose in solution in an inert medium, for example alcohols, ethers, or hydrocarbons of the aromatic, cycloparaffin or aliphatic series. The pressure may be due to the vapours of the reagent itself, for example the pressure of the olefine, or it may be due to the pressure of the vapours of a gaseous or comparatively volatile diluent. It is not in all cases necessary that the medium or diluent employed should be completely inert to the reaction, since a medium may be employed, for example acetic acid, which may react under the conditions of the process, for example in presence of caustic soda as catalyst, to form a new diluent, such as ethyl acetate.

Depending on the nature of the substituent groups which are introduced in accordance with the invention and upon whether the derivatives are mixed or not, the products may be used for a variety of purposes. Those which are water resistant, i. e. those which do not contain hydrophile groups, such as hydroxy, carboxy or sulphonic groups, may be used for any purpose to which cellulose acetate and benzyl cellulose have in the past been applied, for example for the manufacture of artificial silk or ribbons, films, by wet or dry spinning processes, lacquers, dopes, varnishes, plastics, insulating media and the like. Cellulose derivatives produced in accordance with the invention which do contain hydrophile groups, particularly those of the above character, may be employed as sizes for textile and other purposes, and in general for all applications to which colloids which are water-soluble or easily dispersed in water have previously been applied.

The following examples illustrate the invention but are not to be considered as limiting it in any way:—

Example 1

100 parts of cotton cellulose or purified sulphite wood pulp are pretreated with four times their own weight of isopropyl ether containing 15–20% of concentrated sulphuric acid based on the weight of the cellulose. The pretreatment is continued for 10–12 hours. To the mixture in an autoclave are added 300–400 parts of cyclo-hexene, the autoclave closed and the whole heated to a temperature of 150–200° C. The reaction is continued for 8–12 hours or until the required increase in weight is obtained, after which the autoclave is cooled and the cellulosic material separated from the liquid contents.

The product may, if desired, be acetylated by treatment with 600 parts of acetic acid and 300 parts of acetic anhydride at ordinary temperatures, the sulphuric acid already contained in the cellulosic material acting as a catalyst. Alternatively the catalyst may be neutralized and excess caustic soda seated upon the cellulose product and the product thereafter etherified, for example with benzyl chloride, diethyl sulphate or the like.

In a similar manner cellulose may be brought to reaction with the homologues and analogues of cyclo-hexene, for example the methyl cyclohexenes.

Example 2

100 parts of cotton cellulose or purified sulphite wood pulp are pretreated as in Example 1 and the isopropyl ether thereafter evaporated. The cellulose is placed in an autoclave and isobutylene gas passed through until all the air is displaced. The autoclave is then closed and further isobutylene passed in and the temperature raised to 170–190° C. until the pressure obtained is 150–200 atmospheres. The pressure is maintained for 15–20 hours, after which the supply of isobutylene is cut off and the autoclave cooled.

The converted cellulose may thereafter be treated as in Example 1.

In a similar way reactions with other olefines may be carried out in the gaseous phase. For example the liquid product obtained by cooling the gases from the cracking of petroleum oils to a temperature of −10° C. may be used as the source of the olefines.

Example 3

100 parts of cotton cellulose or of purified sulphite wood pulp are pretreated with about half their own weight of a mixture of equal parts of sulphuric and phosphoric acids dissolved in benzene. The pretreated product is thereafter treated in an autoclave together with the benzene under the conditions specified in Example 1, using 300–400 parts of styrene instead of the 300–400 parts of cyclo-hexene. The product separated from the reaction mixture may be thereafter acetylated, etherified or otherwise treated as desired.

Though the invention has been described above more particularly in relation to the manufacture of derivatives of cellulose, it may be applied to the manufacture of derivatives of other carbohydrates, for example starch, dextrin and the like. The most valuable of these other carbohydrate derivatives are those which are soluble or easily dispersible in water or aqueous liquors, in which media they may be applied for similar purposes to those mentioned above for corresponding cellulose derivatives. Similarly derivatives of other alcoholic bodies, e. g. glycols, glycerol, erythrite, pentaerythrite, sorbitol, mannitol and other polyhydroxy alcohols may be obtained which are of value for industrial purposes, e. g. in sizes.

What I claim and desire to secure by Letters Patent is:—

1. Process for the manufacture of a carbohydrate derivative which comprises producing said derivative by catalyzing the condensation of a carbohydrate and a hydrocarbon containing the ethylene linkage and free from substituent groups which are reactive towards the carbohydrate under the reaction conditions the reaction being effected under a pressure of at least 10 atmospheres.

2. Process for the manufacture of a cellulose derivative, which comprises producing said derivative by catalyzing the condensation of cellulosic material containing free hydroxy groups and a hydrocarbon containing the ethylene linkage and free from substituent groups which are reactive towards said cellulosic material under the reaction conditions, the reaction being effected under a pressure of at least 10 atmospheres.

3. Process for the manufacture of a cellulose derivative, which comprises producing said derivative by catalyzing the condensation of cellulose and a substituted hydrocarbon containing the ethylene linkage and free from substituent groups which are reactive towards cellulose under the reaction conditions, the reaction being effected under a pressure of at least 50 atmospheres.

4. Process for the manufacture of a cellulose derivative, which comprises producing said derivative by catalyzing the condensation of cellulose and a hydrocarbon, containing the ethylene linkage and free from substituent groups which are reactive towards cellulose under the reaction conditions, said reaction being effected under a pressure of at least 50 atmospheres.

5. Process for the manufacture of a cellulose derivative, which comprises producing said derivative by catalyzing the condensation of cellulose and a hydrocarbon, containing the ethylene linkage and free from substituent groups which are reactive towards cellulose under the reaction conditions, the reaction being effected under a pressure of at least 50 atmospheres, and at a temperature in excess of 100° C.

6. Process for the manufacture of a cellulose derivative, which comprises producing said derivative by catalyzing the condensation of cellulose and a hydrocarbon, containing the ethylene linkage and free from substituent groups which are reactive towards cellulose under the reaction conditions, the reaction being effected under a pressure of at least 50 atmospheres and at a temperature in excess of 100° C., and subsequently subjecting the product of said condensation to esterification.

7. Process for the manufacture of a cellulose derivative, which comprises producing said derivative by catalyzing the condensation of cellulose and a hydrocarbon, containing the ethylene linkage and free from substituent groups which are reactive towards cellulose under the reaction conditions, the reaction being effected under a pressure of at least 50 atmospheres and at a temperature in excess of 100° C., and subsequently subjecting the product of said condensation to etherification.

8. Process for the manufacture of a cellulose derivative, which comprises producing said derivative by catalyzing the condensation of cellulose and cyclo-hexene, said condensation being effected under a pressure of at least 50 atmospheres, and at a temperature in excess of 100° C.

9. Process for the manufacture of a cellulose derivative, which comprises producing said derivative by catalyzing the condensation, in the presence of an acid catalyst, of cellulose and isobutylene, said condensation being effected under a pressure of at least 50 atmospheres, and at a temperature in excess of 100° C.

10. Process for the manufacture of a cellulose derivative, which comprises producing said derivative by catalyzing condensation of cellulose and a substituted hydrocarbon, containing the ethylene linkage and free from substituent groups which are reactive towards cellulose under the reaction conditions, said reaction being effected under a pressure of at least 50 atmospheres, and at a temperature in excess of 100° C.

HENRY DREYFUS.